Dec. 4, 1956   J. R. NANCE   2,772,921
GARDEN SPRAYING DEVICE
Filed Dec. 5, 1955   2 Sheets-Sheet 1

James R. Nance
INVENTOR.

Dec. 4, 1956  J. R. NANCE  2,772,921
GARDEN SPRAYING DEVICE
Filed Dec. 5, 1955  2 Sheets-Sheet 2
Fig. 4
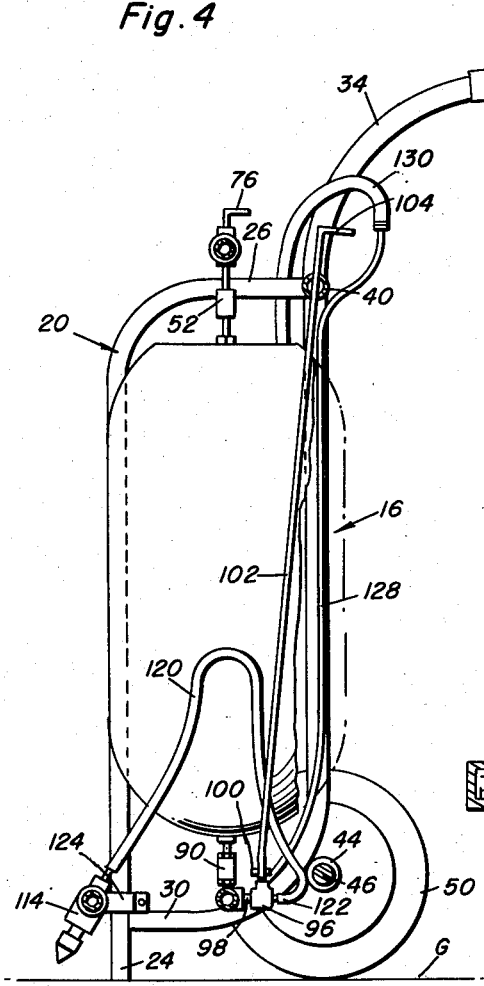
Fig. 6
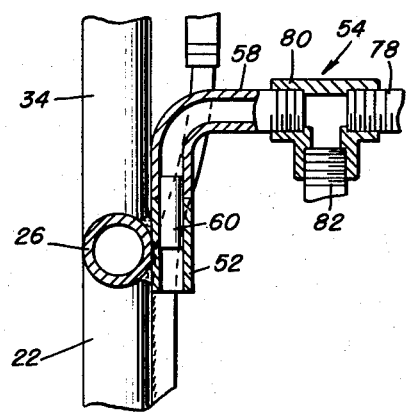
Fig. 7
Fig. 8
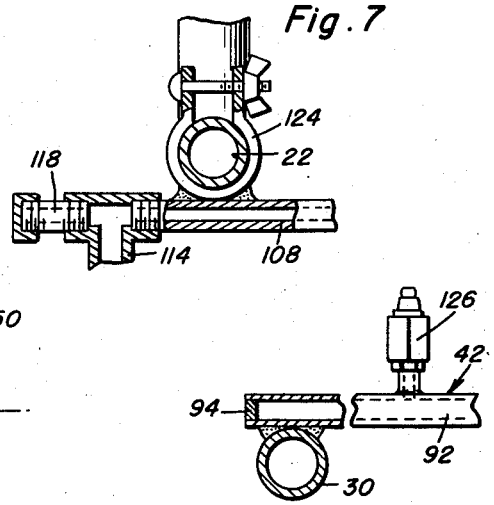
Fig. 5
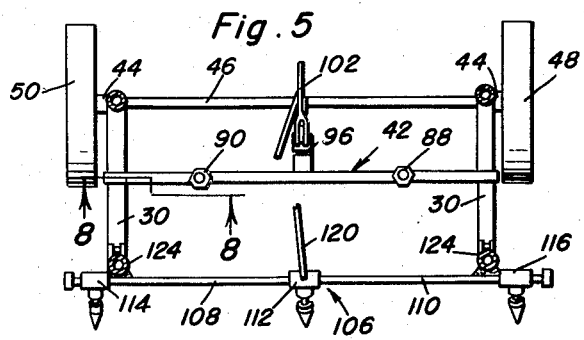
James R. Nance
INVENTOR.
BY
Attorneys

United States Patent Office 2,772,921
Patented Dec. 4, 1956

2,772,921

GARDEN SPRAYING DEVICE

James R. Nance, Winchester, Ind.

Application December 5, 1955, Serial No. 551,032

5 Claims. (Cl. 299—43)

This invention relates generally to spraying devices and more particularly concerned with a readily portable spraying device for use in cultivating, fertilizing, spraying insecticide, etc.

A primary object of the invention is to provide a portable sprayer incorporating a pair of readily removable tanks which may be utilized to contain different spraying fluids, one of which being used as a pressure reservoir tank and the other of which being used as a pressurized fluid spray supply source.

Another object of the invention is to provide a portable sprayer including a hand-truck type frame supporting a pair of removable side-by-side tanks, one of which containing a liquid to be sprayed and other of which comprising a pressure reservoir, a manifold removably carried on an upper portion of the frame and including valve means for controlling communication between the tanks for pressurizing the liquid contained in the one tank, said liquid containing tank communicating with a lower manifold including valve means for controlling the emission of pressurized fluid to spray nozzle means.

A further object of the invention in conformance with that set forth above is to provide a portable sprayer device of the character set forth which is economically and readily manufactured, easily manipulated and maintained, adaptable for varying spray operations, and highly efficient and acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a sectional view taken substantially on line 4—4 of Figure 3 with parts broken away for clarity;

Figure 5 is a sectional view taken substantially on line 5—5 of Figure 1;

Figure 6 is an enlarged fragmentary sectional view taken substantially on line 6—6 of Figure 3 showing details of the end portion of the upper manifold;

Figure 7 is an enlarged fragmentary sectional view taken substantially on line 7—7 of Figure 1 showing a detail of the lower spray nozzle of the device; and Figure 8 is an enlarged sectional view taken substantially on line 8—8 of Figure 5 showing a detail of the lower manifold of the spraying assembly.

The spraying assembly is indicated generally at 10 and includes a vehicular hand-truck type frame 12 which carries a pair of side-by-side removable tank members 14 and 16.

Figure 2:
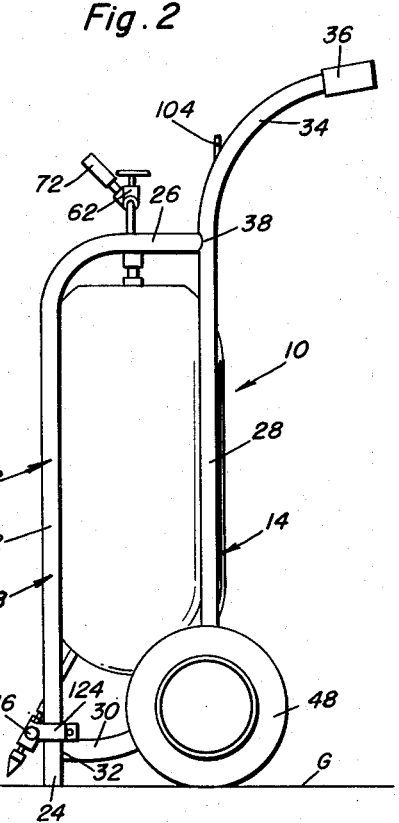
Figure 2 is a side elevational view of the assembly.
Figure 3:
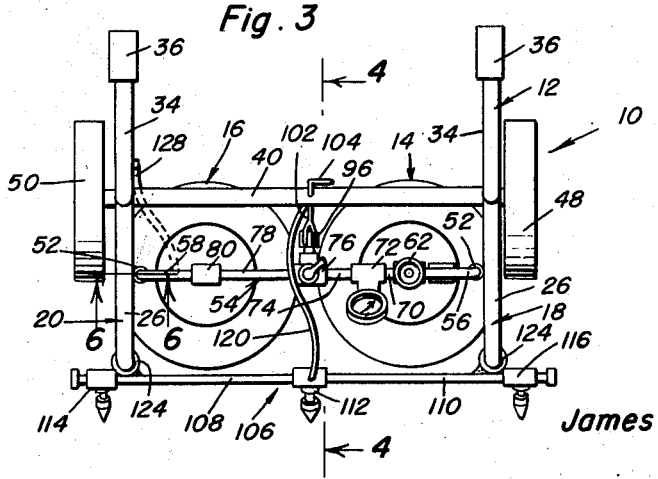
Figure 3 is a top plan view of the novel assembly.

The frame 12 includes side frame members 18 and 20, each of which including a forward leg portion 22 having a lower end portion 24 engageable with the ground surface G, said leg portion 22 terminating in an angulated upper end portion 26, see Figure 2. The side frame members include a rear leg portion 28 terminating in a lower angulated portion 30 suitably secured at 32 to an intermediate portion of the forward leg 22 and having an upwardly extending oppositely angulated portion 34 terminating in a handle member 36, said rear leg 28 being secured to the portion 26 of the forward leg in any suitable manner at 38. Suitably secured between intermediate portions of the leg members 28 is a transverse brace element 40, oppositely disposed portions of the rear leg portion 30 having secured thereto a transversely extending lower or first manifold member indicated generally at 42.

Suitably secured to a lower rear portion of the rear leg members 28 are transversely aligned journal sleeve elements 44, see Figures 4 and 5, which rotatably support a transversely extending support axle 46 which carries on the opposite ends thereof suitable ground engaging wheels 48 and 50. It will be noticed, as seen in Figures 2 and 4, the lower portion 24 of the forward legs 22 of the side frame members together with the wheels 48 and 50 support the frame 12 in a substantially vertical position.

Suitably secured to an intermediate portion of the angulated portion 26 of the forward leg members 22 are transversely disposed tubular socket elements 52, see Figure 6, which removably support an upper manifold indicated generally at 54.

The upper manifold 54 comprises a pair of tubular angulated ends 56 and 58 each of which being closed by means of a reduced diameter pin element 60, see Figure 6, which is slidably received in one of the sockets 52. The portion 56 communicates with a suitable control valve 62, said valve communicating and controlling pressure from the tank member 14 by means of a detachable connection 64 of any conventional nature. The tank 14 has mounted thereon in communication with the interior a suitable pressure gauge 66 and an inlet valve means 68 whereby said tank may be pressurized in any convenient manner from the compressor outlet of a service or gas station, for example. The valve 62 is connected by means of a nipple 70 to a pressure gauge 72 of any convenient character, said pressure gauge being in communication through the nipple 74 to a suitable control valve 76 which communicates through the nipple or conduit portion 78 to a T 80 connected to the end portion 58 of the manifold. The T fitting 80 is connected by means of a suitable detachable connection element of any convenient nature indicated at 82 to the tank 16 and communicates with the interior thereof. The tank member 16 has a filler cap element 84 permitting the filling of said tank with a liquid to be sprayed, and the tank may include a conventional pop-off valve 86 of any conventional nature.

The lower manifold 42 includes a detachable connection means 88 which is suitably connected to a lower end portion of the tank 14, the connection means 88 being of any conventional nature and serving the purpose of merely supporting the lower end portion of said tank. In spaced relation from the connection means 88 is a conventional detachable connection means 90 secured to the lower end portion of the tank member 16 in any convenient manner and permitting communication from the tank 16 to a transversely disposed tubular portion 92 of the lower manifold member 42. The tubular member 92 is secured by means of suitable plug members 94, see Figure 8, and includes an intermediately disposed valve portion 96, see Figure 4, secured thereto by means of a nipple element 98, the valve including an upwardly extending handle portion 100 controlled by means of a suitably secured rotatable rod 102 which extends upwardly through a suitable apertured portion in the transverse brace 40 and terminating in an angulated handle portion 104 whereby the emission of pressurized liquid from the tank 16 and thence through the manifold tube 92 may be controlled.

A transverse spray nozzle assembly is indicated generally at 106 and includes a pair of elongated conduit portions 108 and 110 secured at one end to a downwardly directed jet or nozzle assembly 112 of any suitable character, the opposite ends of the conduit elements 108 and 110 being connected to similar jet or nozzle assemblies 114 and 116, respectively. The ends of the nozzle elements 114 and 116 may be closed by means of suitable end closure elements of any conventional character indicated at 119, see Figure 7.

The nozzle 112 is connected to a suitable flexible conduit 120 which is connected at 122 to the valve element 96 and in this manner the pressurized liquid from the manifold 42 is controlled by the valve element 96. The portions 108 and 110 of the nozzle assembly 106 include suitable laterally extending clamp assemblies 124, the clamp assemblies being of any conventional character and being clampingly engaged about the forward leg portions 22 in the side frame members for permitting the nozzle assembly 106 to be vertically adjusted on said leg members.

Figure 1:
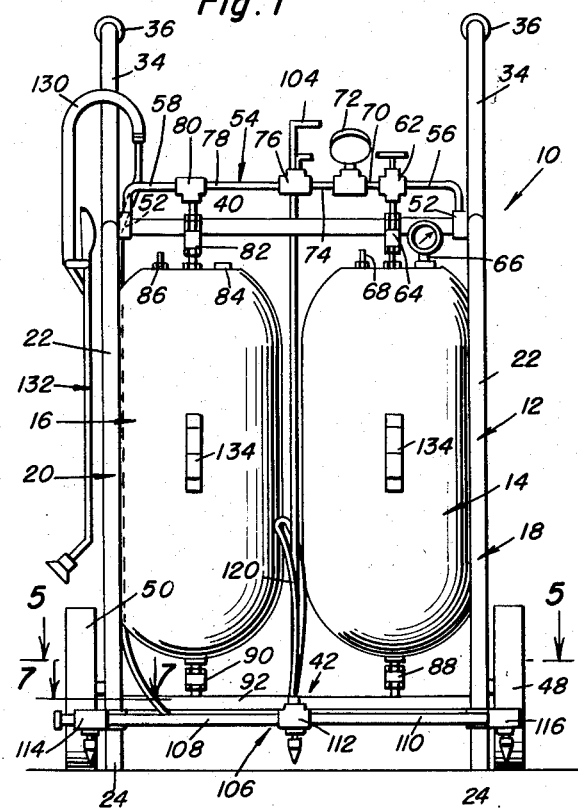
Figure 1 is a front elevational view of the novel spraying assembly.

The manifold conduit 92 has extending therefrom a suitable lateral conduit and connection portion 126, see Figure 8, which is secured to an upwardly extending conduit 128 secured to one of the side frame members, and being connected to a flexible conduit 130, see Figure 1, in any suitable manner, said flexible conduit 130 being connected to a hand manipulable sprayer nozzle assembly 132.

The tank members 14 and 16 may have secured thereon suitable handle members 134 and may be readily removed from the frame 12 by means of the detachable connecting portions 64 and 88, and 82 and 90, respectively, whereby liquid containing tanks having various ingredients, i. e., for spraying insects, fertilizing, etc. may be substituted one for the other.

Although the tank 14 has been disclosed as the pressure reservoir, it is readily apparent that the tank 14 may also contain a spraying fluid while being used as the pressure reservoir, thus upon interchanging the connection means 88 and 90 relative to the tanks 14 and 16, the apparatus could be readily used to spray both toxic and non-toxic solutions without endangering delicate plant life.

Various positional directional terms such as "front," "rear," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A portable sprayer assembly comprising a hand-truck type wheeled frame, a first transverse manifold extending across a lower portion of said frame, first and second tank members supported in side-by-side relation on said frame, means detachably securing lower end portions of said tank members on said manifold and permitting communication between the first of said tanks and the manifold, a second transverse manifold removably supported across an upper portion of said frame, means detachably connecting upper end portions of the tank members to said second manifold and permitting communication therebetween, means on the first tank permitting said tank to be filled with a liquid to be sprayed, means on the second tank permitting said tank to be pressurized, first valve means interposed between the second tank and the second manifold for controlling pressure communication to said second manifold, said valve means interposed between the first tank and the first valve means controlling the pressure directed to said first tank, spray nozzle means supported on the lower end portion of said frame in communication with the lower manifold, and a third valve means interposed between said spray nozzle means and the first manifold for controlling the emission of pressurized liquid from said spray nozzle means.

2. A portable sprayer assembly as set forth in claim 1 including a hand manipulable spray nozzle assembly in communication with the first manifold for dispensing pressurized fluid independent of the first mentioned spray nozzle means.

3. A portable sprayer assembly as set forth in claim 1 wherein said spray nozzle means comprises a plurality of outwardly directed spray elements, and means on said frame permitting vertical adjustment of the spray nozzle means on said frame.

4. A portable sprayer assembly comprising a hand-truck type wheeled frame including a pair of side frame members, a first transverse tubular manifold extending across a bottom portion of said side frame members, first and second tanks supported in side-by-side relationship between the side frame members, means detachably securing lower portions of the tanks to said manifold, the first of said tanks communicating with said manifold, the second transverse tubular manifold extending between upper end portions of the side frame members, means removably mounting the second manifold on the side frame member, means detachably connecting and permitting communication between said tanks and the second manifold, removable filler cap means in said first tank for filling the tank with a spray liquid, valve means on said second tank permitting said tank to be pressurized, first valve means on said second manifold interposed between the second tank and said second manifold for controlling pressure communicated to said manifold, second valve means on said second manifold interposed between said manifold and the first tank for controlling pressure on the liquid in the first tank, a vertically adjustable elongated transverse spray nozzle assembly in communication with the first manifold and extending between lower end portions of the side frame members for dispensing the pressurized liquid forward of the frame, and valve means carried on said first manifold for controlling communication between the spray nozzle and the first manifold.

5. A portable sprayer assembly as set forth in claim 4 including a hand manipulable spray nozzle assembly in communication with said first manifold for dispensing pressurized liquid independent of the first mentioned spray nozzle.

References Cited in the file of this patent

UNITED STATES PATENTS

| Number | Name | Date |
|---|---|---|
| 835,408 | Vore et al. | Nov. 6, 1906 |
| 955,344 | Mikorey | Apr. 19, 1910 |
| 1,783,689 | Angier | Dec. 2, 1930 |
| 1,999,563 | Glasgow | Apr. 30, 1935 |
| 2,661,982 | Hudson | Dec. 8, 1953 |